May 25, 1943.   W. G. VAN VOORHIS   2,320,019
CRAWLER DRIVE MECHANISM
Filed Sept. 19, 1941
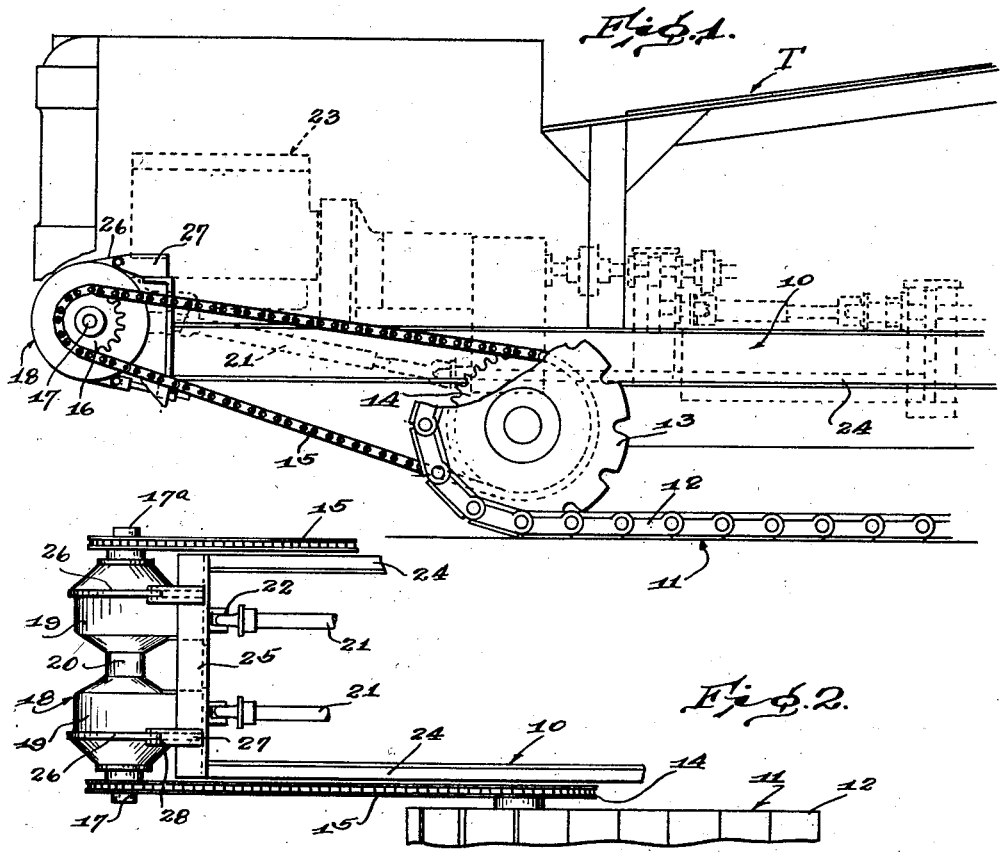
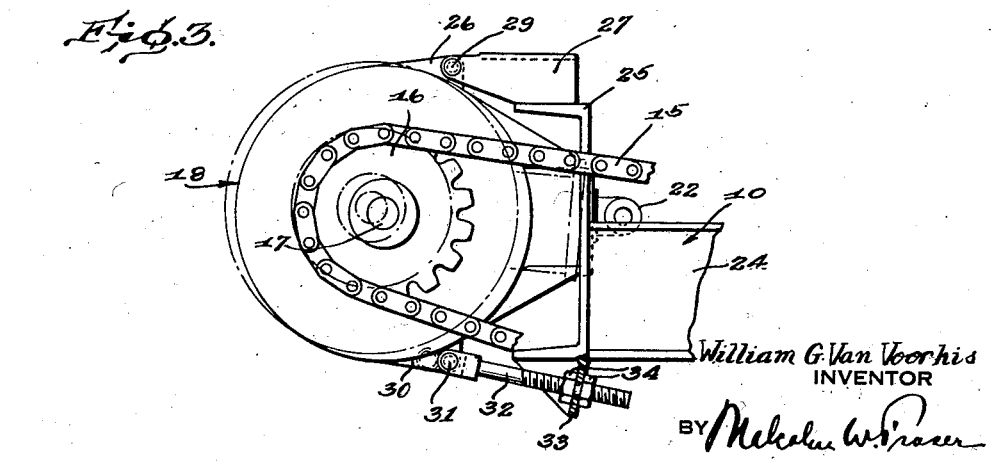
William G. Van Voorhis
INVENTOR
ATTORNEY Patented May 25, 1943

2,320,019

UNITED STATES PATENT OFFICE 2,320,019

CRAWLER DRIVE MECHANISM

William G. Van Voorhis, Findlay, Ohio, assignor to The Buckeye Traction Ditcher Company, Findlay, Ohio, a corporation of Ohio Application September 19, 1941, Serial No. 411,508

2 Claims. (Cl. 305—9)

This invention relates to crawler driven machines of the type having a pair of laterally spaced crawler units providing the tractive power for the machine, but more particularly to machines of this character in which the crawler units are operated by a sprocket and chain drive.

Heretofore the tension on the drive chains would, from time to time, require adjustment because, in the case of improper chain adjustment, a tendency for the chain to climb the sprocket, would be created and in such event costly damage to the driving as well as driven parts would occur. Ordinarily, to correct this difficulty and to effect proper tensioning of the driving chains, certain of the parts would be shimmed. This has proved to be very costly and difficult because of the necessity of tearing down certain parts of the machine and the time consumed in accomplishing the work.

An object is to produce a simple and efficient means by which the tension of the crawler driving chains can be adjusted conveniently and without putting the machine out of use for any substantial period of time.

Another object is to produce new and improved crawler drive mechanism involving sprocket and chain drive for the crawler units by which the tension on the chain drive can be readily and conveniently adjusted.

Other objects and advantages of the invention will hereinafter appear and for purposes of illustration but not of limitation, an embodiment of the invention is shown on the accompanying drawing in which Figure 1 is a fragmentary side elevation of a crawler driven tractor, only so much of the machine being shown as to illustrate the embodiment of the invention;

Figure 2 is a top plan view of a portion of the main frame of the tractor showing the adjustably mounted crawler drive assembly; and Figure 3 is an enlarged end elevation of the crawler drive assembly showing particularly the pivotal mounting thereof and the adjusting means therefor.

The illustrated embodiment of the invention comprises a tractor T having a main supporting frame 10 supported by a pair of laterally spaced crawler units 11, only one of which is shown although it will be understood that a similar arrangement is disposed on the opposite side of the machine. Crawler drives are old and well-known in the art and detail description and illustration thereof is, therefore, not considered necessary since the particular structure and mounting of the crawler units form no part of the present invention. Reference is hereby made to the copending application of Hubert Hollmann, William G. Van Voorhis, Charles L. George and Ralph O. Gerdeman, Serial No. 399,052, filed June 21, 1941, and entitled "Boom type excavator" which illustrates somewhat more in detail the structure of a tractor of this character and although such machine is for forming trenches, it is to be understood that this invention can be advantageously employed in connection with any crawler driven tractor.

The endless belt 12 of each crawler unit 11 is trained about a driving wheel 13 which rotates with a driven sprocket 14. The sprocket 14 is connected by an endless chain 15 to a smaller driving sprocket 16. The driving sprockets 16 are secured to shafts 17 and 17a respectively and these shafts form a part of a right angle drive unit indicated at 18. As shown on the drawing, the drive unit comprises a housing having a pair of relatively large parts 19 and a relatively small connecting part 20. Power is delivered to the drive unit 18 from a pair of drive shafts 21 having universal joint connections 22 respectively with the parts contained within the housing parts 19, one drive shaft being provided for each of the crawler units 11. The drive shafts 21 extend rearwardly and downwardly from the drive unit and receive their power from a power plant 23. The operative connections from the power plant 23 to the drive shafts 21 are generally indicated on Fig. 1 of the drawing but since these particular connections form no part of the present invention and will be readily understood by those skilled in the art, detail description and illustration thereof are not considered necessary.

It will be observed that the main frame 10 includes longitudinally extending beams 24 and a transverse connecting beam 25 in the forward end of the longitudinally disposed beams. The right angle drive unit 18 is pivotally connected for swinging movements about a horizontal axis with respect to the transverse beam 25. It will be observed that each of the housing parts 19 has an outwardly extending flange terminating in a bracket 26 disposed slightly rearwardly of the top center portion of the respective housing and fixed to the upper side of the transverse beam 25 is a pair of laterally spaced brackets 27. Each bracket 27 has a forked end 28 which straddles one of the housing brackets 26. A pin 29 passes through the forked end 28 and the respective housing bracket 26 thereby pivotally to support opposite end portions of the drive unit 18.

On the under side of each of the housing portions 19 is a depending bracket 30 which is disposed slightly rearwardly of the lower central portion of the respective housing portion directly beneath the bracket 26. Pivotally connected by a pin 31 to each of the brackets 30 is a screw-threaded rod 32 which passes through an opening in a forwardly inclined bracket 33 fixed to and depending from the under side of the transverse beam 25. Nuts 34 engage the threaded portion of the rod 32 on opposite sides of the bracket 33 and securely hold the parts in adjusted position.

It will be apparent that the tension on the endless chains 15 can be readily adjusted by loosening the nuts 34 and swinging the drive unit 18 about its pivot pins 29 to take up slack in the chains 15 or relieve the tension thereon according to the direction of adjusting movement. Thereafter by tightening up on the nuts 35, the parts will be securely held in the adjusted position.

From the above description, it will be manifest that an extremely simple but thoroughly satisfactory means for adjusting the tension on the endless chains 15 is provided, enabling the tension on these chains to be adjusted in an extremely short period of time. This is obviously a decided improvement over previous methods employed by which shims were employed to increase or diminish the tension imposed on the driving chains.

It is to be understood that numerous changes in details of construction, arrangement and operation may be effected without departing from the spirit of the invention especially as defined in the appended claims.

What I claim is:

1. The combination of a horizontally disposed main frame, a pair of laterally spaced crawler units providing traction for said frame, a drive mechanism for said crawler units including a power operated drive shaft, a transversely arranged unitary assembly, a universal joint providing a driving connection between said drive shaft and assembly, said assembly having a driving sprocket for each crawler unit, a driven sprocket operatively connected to each crawler unit, a chain connecting each pair of driving and driven sprockets, a hinge connection between the upper portion of said assembly and main frame enabling rocking movement of said assembly relative to the main frame about a horizontally disposed axis, and means at the lower portion of said assembly providing a connection between same and said main frame for effecting the desired rocking of the assembly for regulating the chain tension.

2. The combination of a horizontally disposed main frame, a pair of laterally spaced crawler units providing traction for said frame, a drive mechanism for said crawler units including a power operated drive shaft, a transversely arranged unitary assembly, a universal joint providing a driving connection between said drive shaft and assembly, said assembly having a driving sprocket for each crawler unit, a driven sprocket operatively connected to each crawler unit, a chain connecting each pair of driving and driven sprockets, a hinge connection between one portion of said assembly and main frame enabling rocking movement of said assembly relative to the main frame about a horizontally disposed axis, and means adjacent another portion of said assembly providing a connection between same and said main frame for effecting the desired rocking of the assembly for regulating the chain tension.

WILLIAM G. VAN VOORHIS.